(12) United States Patent
Fukui

(10) Patent No.: US 8,633,990 B2
(45) Date of Patent: Jan. 21, 2014

(54) IMAGING APPARATUS, METHOD OF CONTROLLING THE SAME, AND PROGRAM

(75) Inventor: Hajime Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 76 days.

(21) Appl. No.: 13/464,808

(22) Filed: May 4, 2012

(65) Prior Publication Data

US 2012/0287296 A1    Nov. 15, 2012

(30) Foreign Application Priority Data

May 10, 2011  (JP) ................................. 2011-105416
Apr. 16, 2012  (JP) ................................. 2012-092827

(51) Int. Cl.
| | |
|---|---|
| *H04N 5/225* | (2006.01) |
| *H04N 9/04* | (2006.01) |
| *H04N 5/222* | (2006.01) |
| *H04N 5/76* | (2006.01) |
| *H04M 1/00* | (2006.01) |
| *H04B 1/38* | (2006.01) |

(52) U.S. Cl.
USPC ............... 348/207.99; 348/207.1; 348/207.2; 348/370; 348/231.8; 348/231.9; 455/556.1; 455/556.2

(58) Field of Classification Search
USPC ......................... 348/370–376, 207.1–207.99, 348/231.1–231.99; 455/556.1, 556.2
See application file for complete search history.

(56) References Cited

U.S. PATENT DOCUMENTS

| | | | |
|---|---|---|---|
| 5,895,133 A * | 4/1999 | Hirai .............................. 396/238 |
| 2004/0201747 A1* | 10/2004 | Woods ...................... 348/231.99 |
| 2005/0138182 A1* | 6/2005 | Ryukawa et al. ............. 709/228 |
| 2005/0255817 A1* | 11/2005 | Edeler ......................... 455/161.1 |
| 2006/0082662 A1* | 4/2006 | Isaacson ................. 348/231.99 |
| 2008/0140896 A1* | 6/2008 | Todoroki et al. .............. 710/264 |
| 2009/0167563 A1* | 7/2009 | Liang ............................ 340/928 |
| 2010/0235546 A1* | 9/2010 | Terlizzi et al. .................. 710/16 |
| 2011/0037851 A1* | 2/2011 | Kim et al. ..................... 348/143 |
| 2011/0038268 A1* | 2/2011 | Ross et al. .................... 370/252 |
| 2011/0141293 A1* | 6/2011 | Yoneyama et al. ........ 348/207.1 |
| 2012/0154544 A1* | 6/2012 | Sato ................................ 348/47 |
| 2013/0097695 A1* | 4/2013 | Sipe et al. ....................... 726/17 |
| 2013/0113947 A1* | 5/2013 | Morino ...................... 348/207.1 |
| 2013/0128110 A1* | 5/2013 | Jannard ......................... 348/375 |

FOREIGN PATENT DOCUMENTS

| | | |
|---|---|---|
| JP | 2000-089306 A | 3/2000 |
| JP | 2002-335254 A | 11/2002 |
| JP | 2003-218763 A | 7/2003 |

\* cited by examiner

*Primary Examiner* — Chia-Wei A Chen
(74) *Attorney, Agent, or Firm* — Canon U.S.A., Inc., IP Division

(57) ABSTRACT

An imaging apparatus includes a communication unit that executes data communication with a predetermined number of external devices, a search unit that searches for external devices that can executes data communication with the imaging apparatus, and a determination unit that, if the search unit finds a number of external devices that is greater than the predetermined number, determines with which of the external devices communication is to be activated. The determining unit is configured to, in case that the imaging unit executes an imaging process, preferentially activate communication with external devices that are used in the imaging process.

10 Claims, 10 Drawing Sheets

FIG.8

PERIPHERAL DEVICES

1. SPEEDLITE 600EX_1
2. SPEEDLITE 600EX_2
3. SPEEDLITE 600EX_3
4. SPEEDLITE 600EX_4
5. SPEEDLITE 450EX_1
6. SPEEDLITE 450EX_2
7. SPEEDLITE 450EX_3
8. GPS RECEIVER GP1
9. WIRELESS MIC M1

IMAGING APPARATUS, METHOD OF CONTROLLING THE SAME, AND PROGRAM

BACKGROUND OF THE INVENTION

1. Field of the Invention

The present invention relates to a wirelessly-connectable imaging system and a method of controlling the imaging system. In particular, it relates to a suitable technique used for a wirelessly-connectable imaging apparatus and peripheral devices thereof.

2. Description of the Related Art

Conventionally, controlling systems is performed by an optical or wireless communication connection between devices in various fields. For example, it is known that an imaging apparatus and a flash device as a peripheral device of the imaging apparatus are connected via an optical signal to control light emission. In another case, instead an optical signal, a wireless communication using a radio wave of 2.4 GHz, referred to as the Industry Science Medical (ISM) band, is used. Since end-users can use the ISM band without authorization, the ISM band is used in various fields.

Japanese Patent Application Laid-Open No. 2000-089306, for example, discusses an imaging apparatus that uses optical communication to execute light emission control. More specifically, the technique uses a light emission pulse of a flash device for optical communication connection between a master imaging apparatus and a slave flash device. Since this technique uses visible light having a short wavelength, the directivity is great. As a result, if an obstacle or the like is present between the master imaging apparatus and the slave flash device, accurate optical communication may not be executed.

Japanese Patent Application Laid-Open No. 2003-218763 discusses a wireless communication system that uses a wireless communication standard referred to as Bluetooth® to connect mobile phones or to connect a mobile phone and a printer. Japanese Patent Application Laid-Open No. 2002-335254 discusses an electronic conference system that uses the Bluetooth® wireless communication standard to wirelessly connect a master terminal and a slave terminal.

Since the techniques discussed in Japanese Patent Application Laid-Open No. 2003-218763 and Japanese Patent Application Laid-Open No. 2002-335254 use a radio wave, the wavelength is longer and the directivity is wider than light. Thus, signals can easily reach around and behind obstacles by diffraction. While relatively less influenced by such obstacles or the like, the communication system is restricted by conditions unique thereto.

For example, in a small-sized network referred to as a piconet, which is defined by the Bluetooth® wireless standard and thus not described in detail herein, the maximum number of slave devices that can simultaneously be connected is seven.

If more than eight slave devices are present, seven slave devices are set to be active, and the other slave devices are set to a standby mode referred to as a park mode. Namely, the slave devices are connected by being switched between active and park as needed. Thus, the above Japanese Patent Application Laid-Open No. 2003-218763 discusses displaying a warning message or the like when more than eight slave devices are present.

An electronic conference system, as discussed in the Japanese Patent Application Laid-Open No. 2002-335254, sequentially switches active and park when more than seven slave devices are present. However, if this wireless system is applied to an imaging system with flash devices, inappropriate switching may impact the imaging process.

SUMMARY OF THE INVENTION

According to an aspect of the present invention, an imaging apparatus includes a communication unit configured to execute data communication with a predetermined number of external devices, a search unit configured to search for external devices capable of executing data communication with the communication unit; and a determination unit configured to, if the search unit finds a number of external devices that is greater than the predetermined number, determine with which of the external devices communication is to be activated. The determining unit is configured to, in a case that the imaging unit executes an imaging process, preferentially activate communication with external devices that are used in the imaging process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates a display example of wireless connection according to the first exemplary embodiment.

DESCRIPTION OF THE EMBODIMENTS

Various exemplary embodiments, features, and aspects of the invention will be described in detail below with reference to the drawings.

Figure 1:
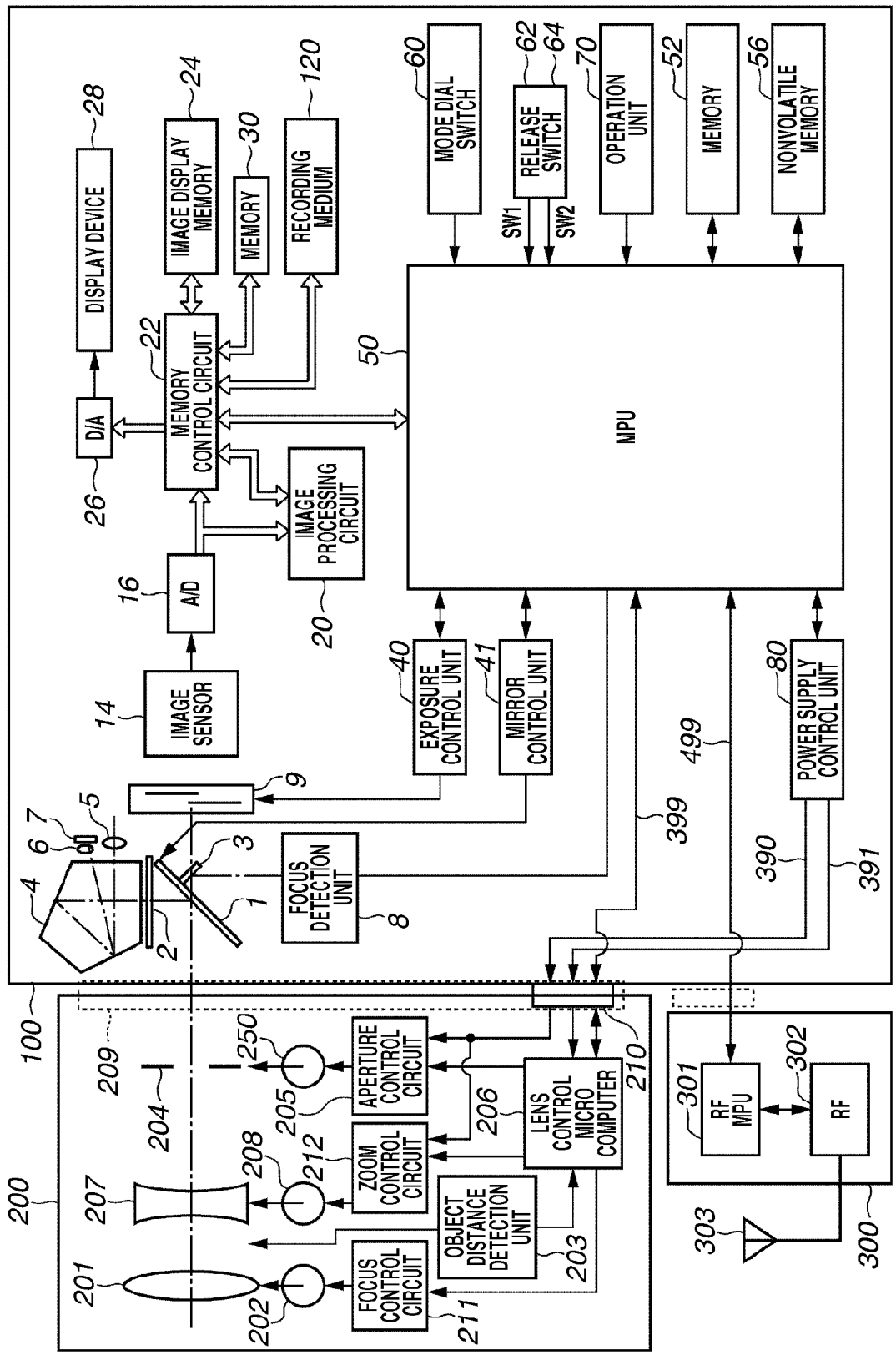
FIG. 1 is a block diagram illustrating a configuration of an imaging system according to a first exemplary embodiment.

Hereinafter, a first exemplary embodiment will be described. FIG. 1 illustrates a configuration of a wirelessly connectable imaging system according to a first exemplary embodiment. A camera body (master imaging apparatus) 100 includes a main mirror 1. When the user looks through a finder, the main mirror 1 is arranged diagonally in the imaging optical path. When the user captures an image, the main mirror 1 is retracted to the outside of the imaging optical path. In addition, the main mirror 1 is a half mirror, and when arranged diagonally in the imaging optical path, the main mirror 1 transmits approximately half of the light from the object to a focus detection optical system. The camera body 100 also includes a focus plate 2 on which an object image formed by a focus lens 201 is projected.

A sub-mirror 3 is also arranged diagonally in the imaging optical path along with the main mirror 1 when the user looks through the finder. When the user captures an image, the sub-mirror 3 is retracted to the outside of the imaging optical path. The sub-mirror 3 bends the light transmitted through the diagonally-arranged main mirror 1 downward to guide the light to a focus detection unit 8. A pentagonal prism 4 changes the finder optical path, and an eyepiece 5 is a window through which the user observes the focus plate 2. In this way, the user can observe a captured image.

An imaging lens 6 and a light metering sensor 7 measure luminance of the object on a finder observation screen. The focus detection unit 8 uses a known phase difference system. In addition, the camera body 100 includes a focal plane shutter 9 and an image sensor 14 such as a complementary metal oxide semiconductor (CMOS). An analog-to-digital (A/D) converter 16 converts an analog signal output from the image sensor 14 into a digital signal.

An image processing circuit 20 executes predetermined pixel interpolation processing on data from the A/D converter 16 or data from a memory control circuit 22. The memory control circuit 22 controls the A/D converter 16, the image processing circuit 20, an image display memory 24, a digital-to-analog (D/A) converter 26, and a memory 30. A display device 28 includes a thin-film transistor liquid crystal display (TFT LCD) located on the back of the camera body 100. The image display memory 24 supplies display image data written therein to the display device 28 via the D/A converter 26, and the display device 28 displays the image data. The display device 28 also serves as a display interface for camera operations. Namely, the display device 28 displays various camera operation statuses.

The memory 30 stores captured still images and moving images and has a memory capacity sufficient to store a predetermined number of still images or a predetermined time of moving image. In addition, the memory 30 is used as a work area of a camera micro processing unit (MPU) 50.

An exposure control unit 40 controls the shutter 9, and a mirror control unit 41 includes a motor and a drive circuit for moving up and down the main mirror 1. The camera MPU 50 controls the entire camera body 100, and a memory 52 stores constants, variables, programs, and the like for operations of the camera MPU 50. A nonvolatile memory 56 can electrically erase and record data, examples of which include an electrically erasable programmable read-only memory (EEPROM).

An operation unit includes switches and dials 60, 62, 64, and 70 to input instructions for various operations of the camera MPU 50.

Hereinafter, the operation unit will be described in detail. The mode dial switch 60 switches various function modes of various imaging modes (manual, aperture-priority AE, shutter-priority AE, program AE). The switch 62 serves as a light-metering and range-finding start switch SW1. If the user presses a shutter button (not illustrated) to a first level, the switch SW1 turns on and gives instructions to start operations such as automatic focus (AF) processing and automatic exposure (AE) processing. The switch 64 serves as a shutter switch SW2. If the user presses the shutter button (not illustrated) to a second level, the switch SW2 turns on and gives instructions to start operations such as a series of processes. For example, the switch SW2 gives instructions to start exposure processing, in which a signal read from the image sensor 14 is supplied to the memory 30 via the A/D converter 16 and the memory control circuit 22 and the supplied signal is written in the memory 30 as image data.

The operation unit 70 includes various types of buttons, a touch panel, and the like. A power supply control unit 80 supplies a necessary voltage to each of the various control circuits via a DC-DC converter. The camera body 100 also includes a recording medium 120 such as a memory card or a hard disk. A communication line 399 is used for communication between an imaging lens 200 and the camera MPU 50, and a communication line 499 is used for communication between an external flash device 400 and the camera MPU 50.

Next, the imaging lens 200 will be described. A focus lens 201 forms an object image on the image sensor 14 and executes focus adjustment. A focus drive actuator 202 drives the focus lens 201 in the direction of the optical axis for focusing. A focus control circuit 211 controls the focus drive actuator 202, based on instructions from a lens control microcomputer (lens control MPU) 206.

An object distance detection unit 203 includes an encoder for detecting the distance of the object by the position of the focus lens, and an aperture 204 adjusts the light quantity during imaging. An aperture control circuit 205 controls an aperture drive actuator 250, based on instructions from the lens control MPU 206.

A zoom lens 207 adjusts the focal length for magnification, and a zoom drive actuator 208 drives the zoom lens 207 in the direction of the optical axis to electrically adjust the focal length. A zoom control circuit 212 controls the zoom drive actuator 208.

The lens control microcomputer 206 controls the focus drive, the aperture drive, and the like and controls communication with the camera MPU 50 of the camera body 100 side. In addition, the imaging lens 200 is detachably attached to the camera body 100 via a lens mount 209. The imaging lens 200 is electrically connected to the camera body 100 via a connector 210 including serial communication lines and a power supply.

A wireless communication unit 300 is detachably attached to the camera body 100, and an MPU 301 controls the wireless communication unit 300 and serves as a slave operation mode setting unit. A wireless communication radio frequency (RF) module 302 includes a publicly known RF chip that processes a wireless protocol such as ZigBee® or Bluetooth® for signal transmission and reception in the 2.4 GHZ band (IMS band), for example. An antenna 303 transmits and receives radio waves. In the present exemplary embodiment, the wireless communication unit 300 is detachably attached to the camera body 100. However, the wireless communication unit 300 may be incorporated in the camera body 100.

Figure 2:
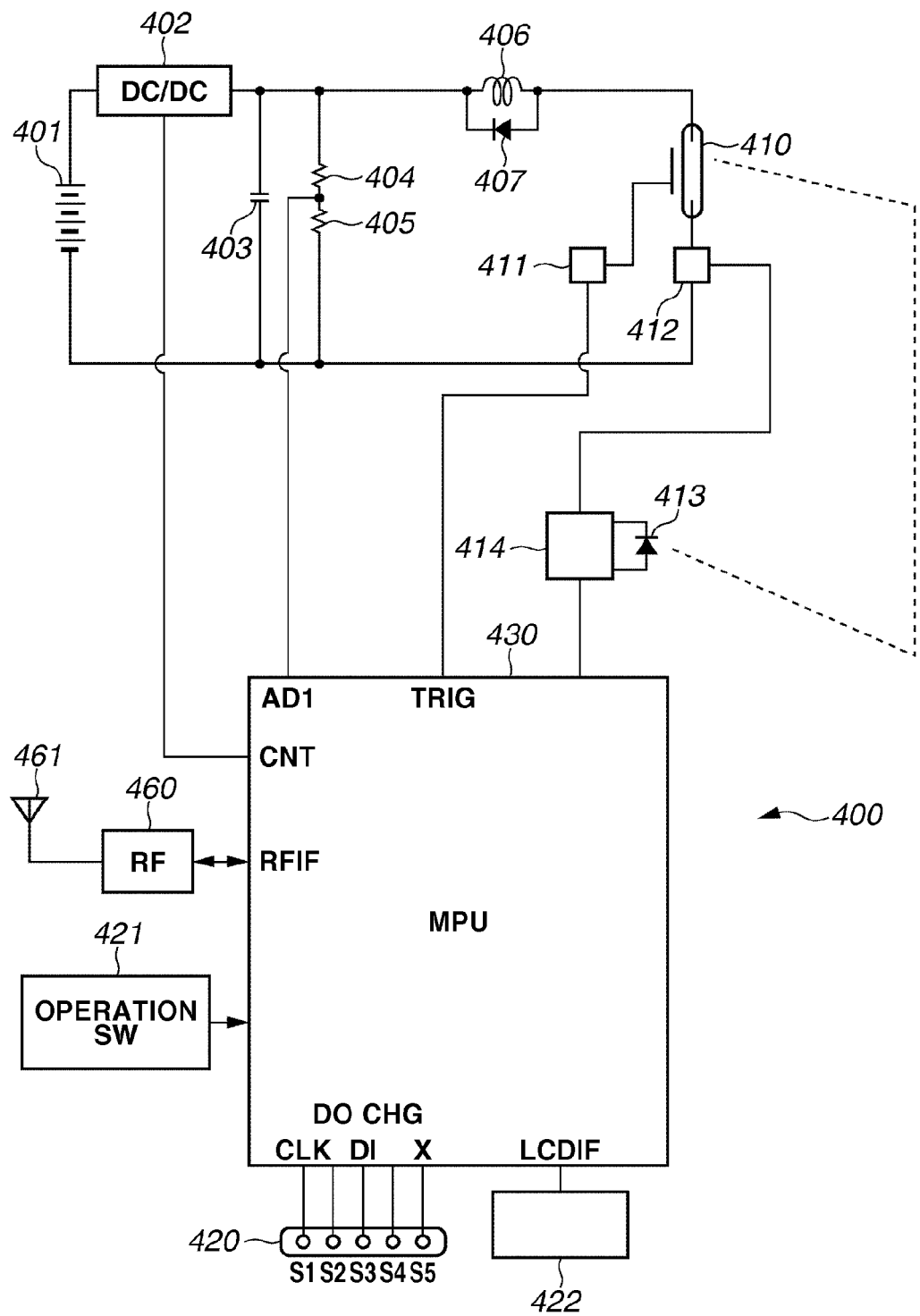
FIG. 2 is a block diagram illustrating an electrical configuration of a flash device.

Next, a circuit configuration of the flash device 400 will be described with reference to FIG. 2. The flash device 400 is electrically connected to the camera body 100 by group of contacts 420. A DC-DC converter 402 increases the voltage of a power supply battery 401 up to several hundred volts. A main capacitor 403 stores light emission energy. Resistors 404 and 405 divide the voltage across the main capacitor 403 into a predetermined ratio.

The flash device 400 includes: a coil 406 that limits light emission current; a diode 407 that absorbs back electromotive force generated when light emission is stopped; and a xenon (Xe) tube 410. In addition, the flash device 400 includes a trigger generation circuit 411 and a light emission control circuit 412 such as an insulated-gate bipolar transistor (IGBT). A photodiode 413 serves as a light receiving sensor for controlling light emission and monitors the optical output from the Xe tube 410. A light quantity control circuit 414 amplifies the optical current flowing through the photodiode 413. When the optical current reaches a predetermined value, the light quantity control circuit 414 controls conduction of the light emission control circuit 412 to adjust the light quantity.

In addition, the flash device 400 includes an operation unit 421 for setting operation modes (normal, master, and slave) and a display device 422 such as an LCD for displaying the operation modes. In addition, the flash device 400 includes an RF module 460 similar to the wireless communication RF module 302 in FIG. 1 and an antenna 461 for transmission and reception. A flash device MPU 430 sets the status to active state or inactive state based on instructions from the master apparatus 100.

Figure 3:
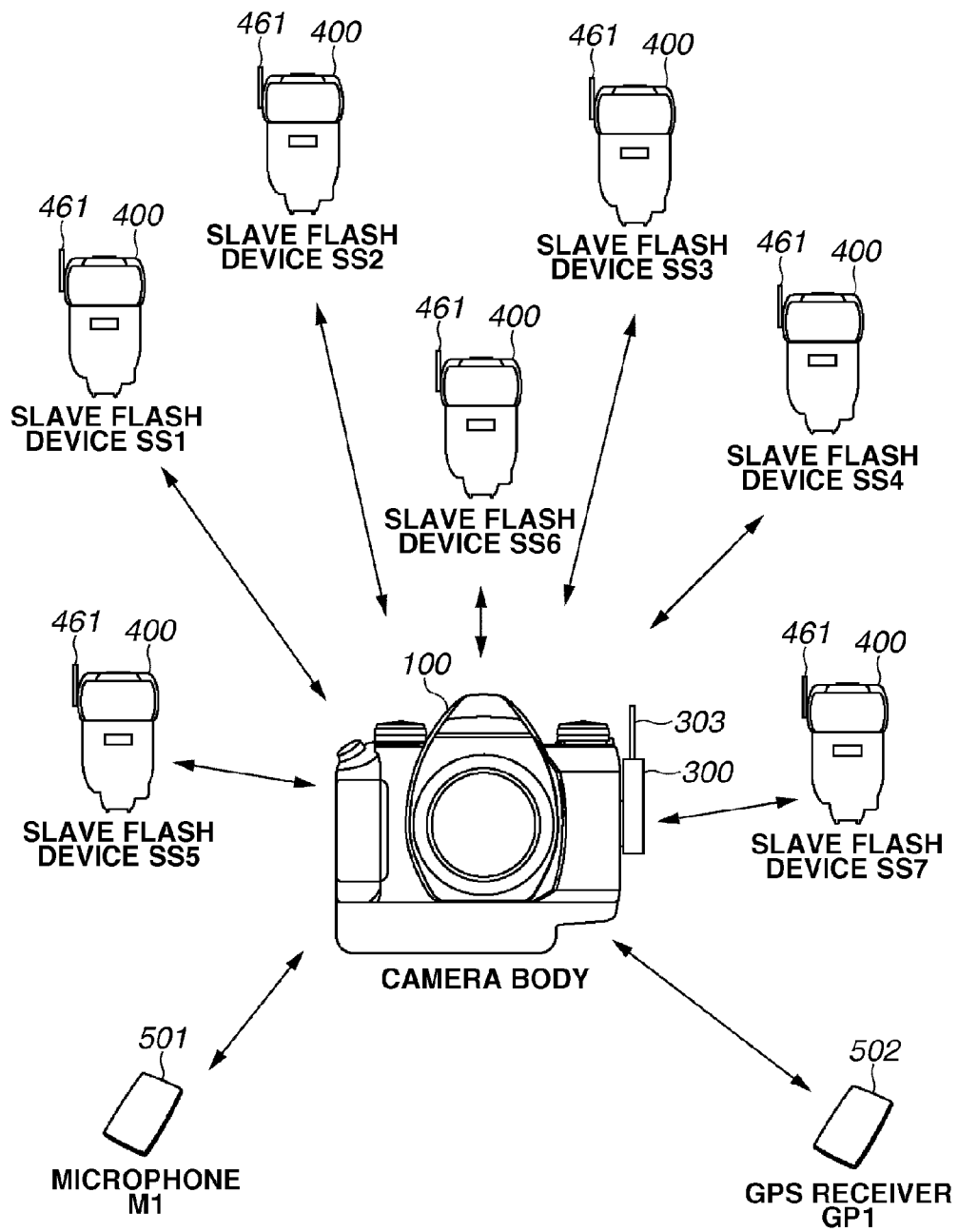
FIG. 3 illustrates an imaging system in which a camera body and a plurality of slave devices are connected.
Figure 4:
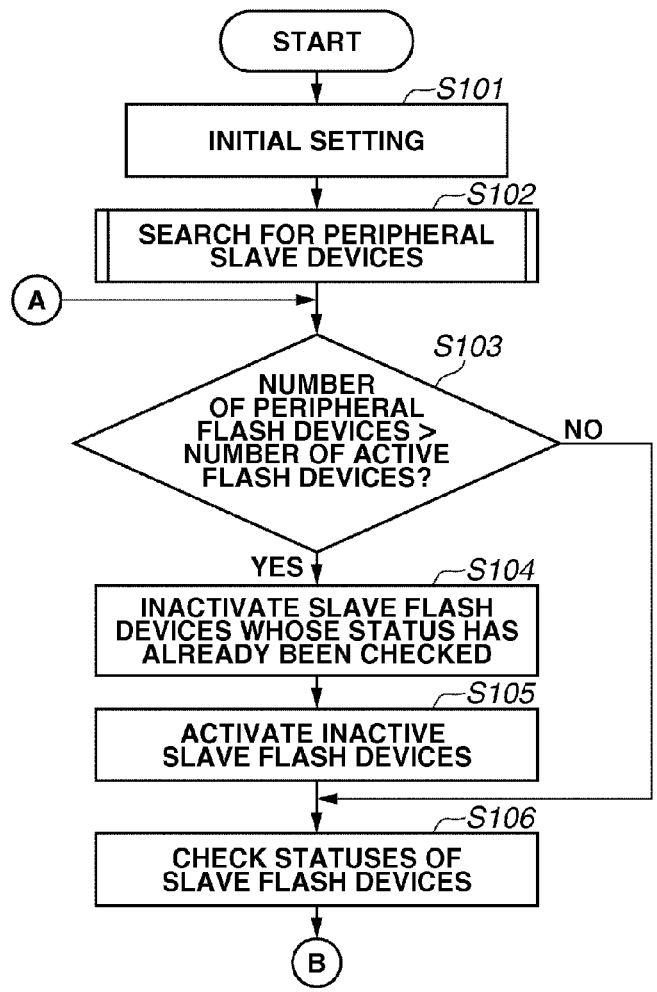
FIG. 4 is a flow chart illustrating a main operation of the imaging system.
Figure 5:
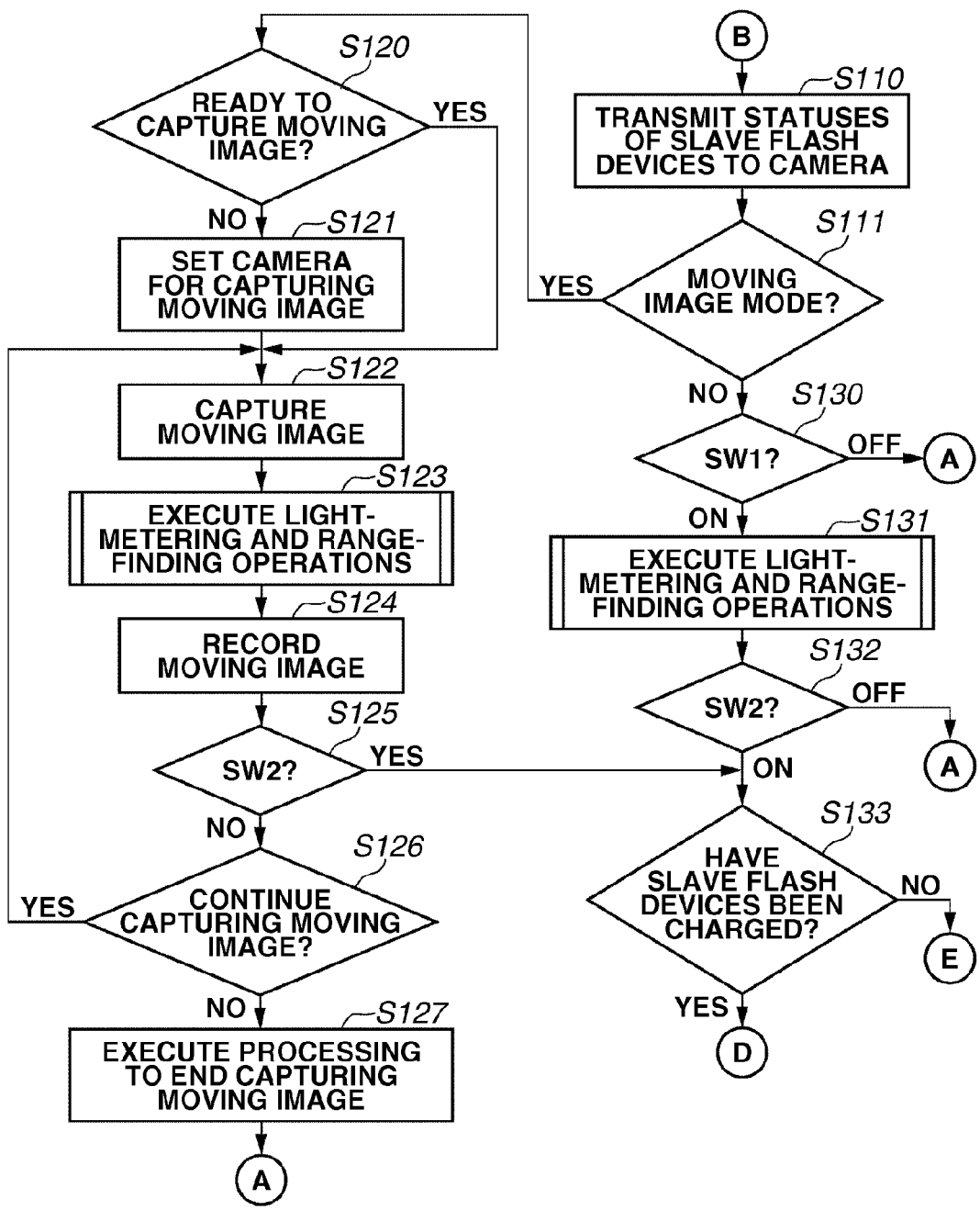
FIG. 5 is a flow chart illustrating a main operation of a slave flash device.
Figure 6:
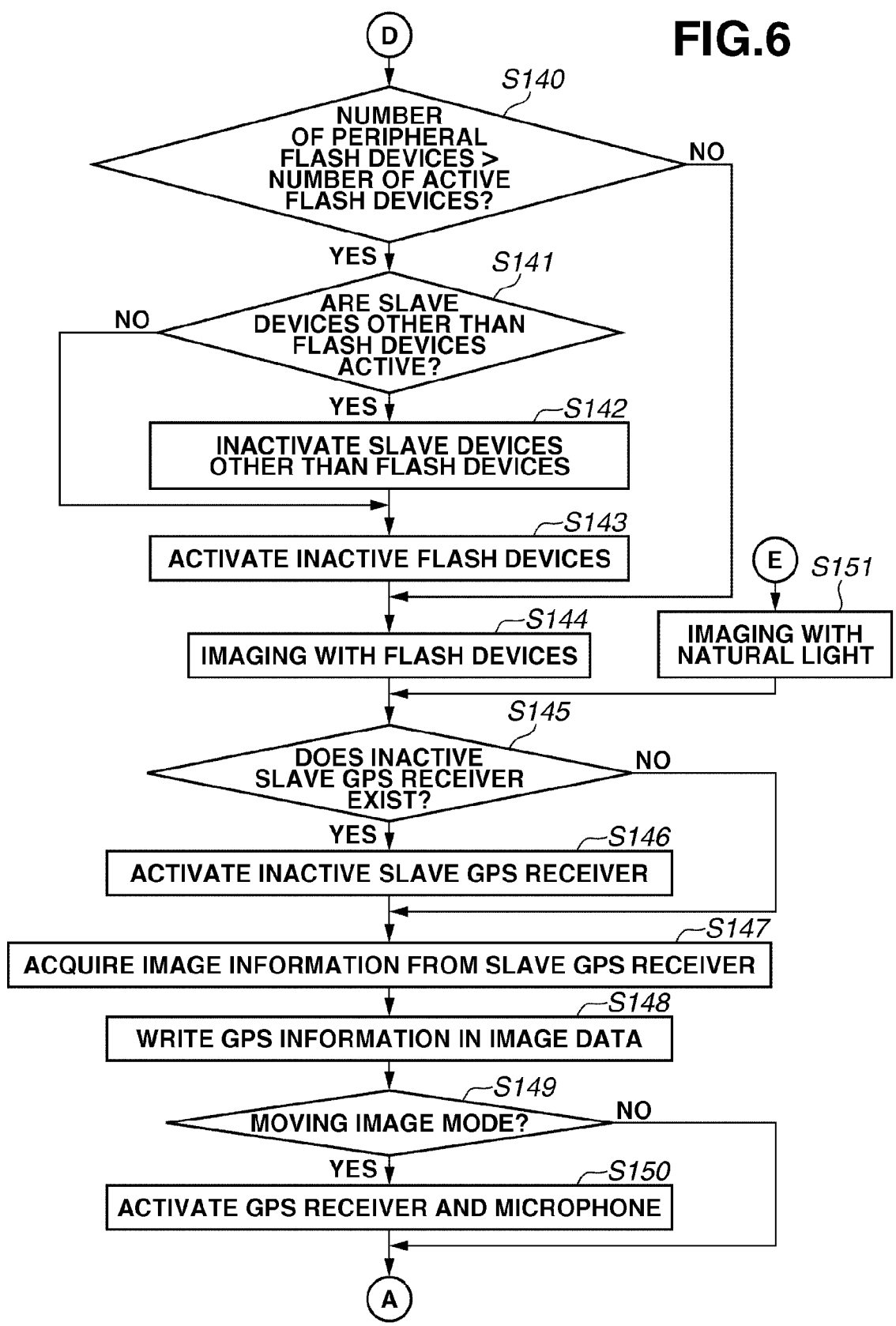
FIG. 6 is a flow chart illustrating activation operation of slave devices.

FIG. 3 illustrates an example of the imaging system according to the present exemplary embodiment. The members identical to those in FIGS. 1 and 2 are denoted by the same reference numbers. The wireless communication unit 300 including the antenna 303 is attached to one side of the camera body 100. A plurality of slave flash devices 400, more specifically, seven slave flash devices SS1 to SS7 each including the antenna 461, are set in the present exemplary embodiment.

The imaging system includes a wireless microphone M1 501 and a wireless GPS receiver (GPS reception device) GP1 502. A connection between the camera body 100 including the wireless communication unit 300 and each slave flash devices SS1 to SS7, the wireless microphone M1, and wireless GPS receiver GP1 can be performed via radio waves.

Next, operation flows according to the present exemplary embodiment will be described with reference to the flow charts in FIGS. 4 to 7. Operations of the camera MPU 50, the RFMPU 301, and the flash device MPU 430 will be described with these flowcharts. First, in step S101, when the user turns on the power supply, the camera MPU 50 initializes flags and control variables, for example.

Figure 7:
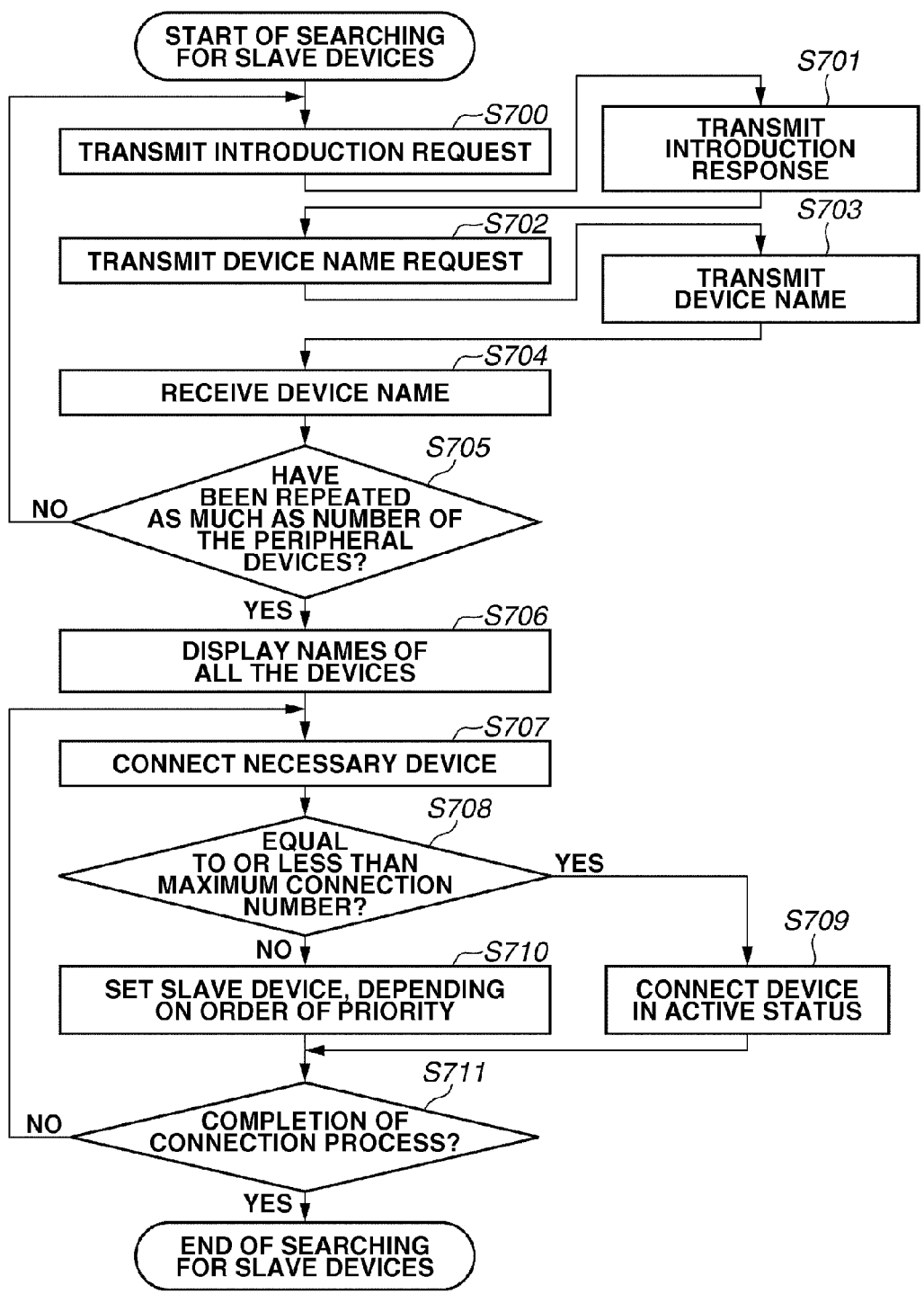
FIG. 7 is a flow chart illustrating an operation of searching for slave devices.

Next, in step S102, the RFMPU 301 searches for slave devices. FIG. 7 illustrates a procedure of searching for peripheral slave devices. First, in step S700, the RFMPU 301 transmits an introduction request command to peripheral slave devices via the RF module 302.

If a peripheral slave device (for example, the flash device 400 in FIG. 2) receives the introduction request via the RF module 460, in step S701, the flash device MPU 430 sets the RF module 460 to a transmission mode and transmits an introduction response. In step S702, upon receiving the introduction response, the RFMPU 301 transmits a device name request to the peripheral slave device. In S703, upon receiving the device name request, the peripheral slave device transmits the device name thereof, as in step S701.

Next, in step S704, the RFMPU 301 receives the above-described device name. In step S705, the RFMPU 301 repeats the above the above-described process for each peripheral device that was found. If the process has been repeated for each of the found peripheral devices (YES in step S705), the operation proceeds to step S706. In step S706, the RFMPU 301 transmits names of all the searched devices to the camera MPU 50, and the camera MPU 50 causes the display device 28 to display the names of all the searched peripheral devices.

FIG. 8 illustrates a display example of the names of the searched peripheral devices. The names are displayed on the display device 28 on the back of the camera body 100. Next, in step S707, the user selects devices that the user wants to connect to the camera body 100, and inputs a passkey for mutual connection.

Figure 9:
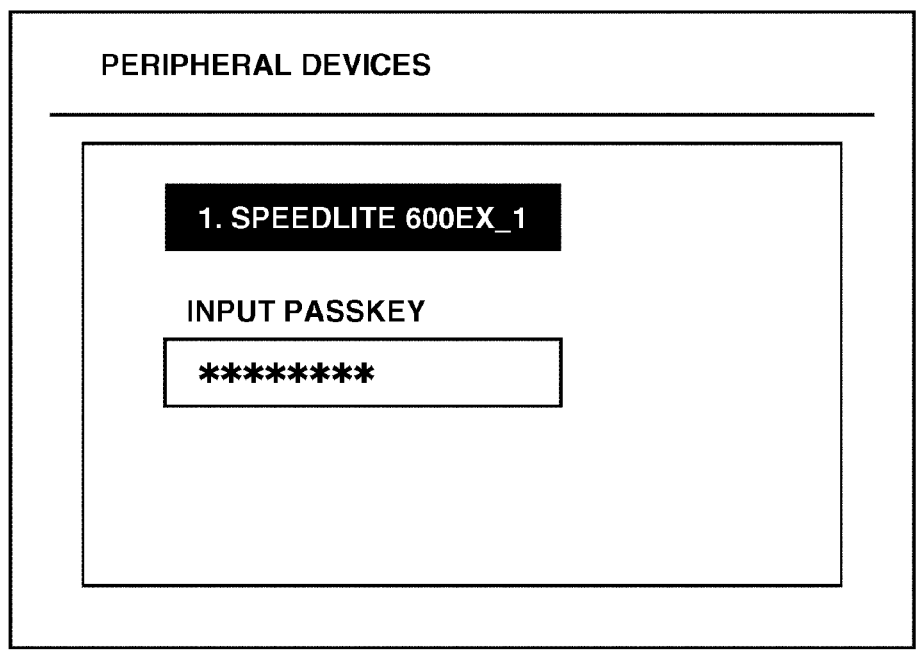
FIG. 9 illustrates an input example of wireless connection according to the first exemplary embodiment.

FIG. 9 illustrates an example of passkey input screen. The user selects device 1 selected in FIG. 8 and inputs a passkey to mutually connect. For example, assuming that on the communication system the maximum number of active slaves that can be connected is seven, if the total number of devices searched in step S707 is less than or equal to the maximum connection number (YES in step S708), the operation proceeds to step S709. In step S709, the slave device is connected in an active status in which the slave device can always communicate with the camera body 100.

However, if the total number of devices searched in step S707 exceeds the maximum connection number (NO in step S708), the operation proceeds to step S710. In step S710, depending on the order of priority required for imaging, the slave device is activated or inactivated (e.g., a park status in the case of Bluetooth®).

Hereinafter, the order of priority will be described. For example, as illustrated in FIG. 3, if seven slave flash devices, one wireless microphone 501, and one GPS receiver 502 are present around the camera body 100, the total number of peripheral devices is nine. At least two of the peripheral devices need to be connected in an inactive status. In such case, the order of priority defines which peripheral devices need to be connected in which status. For example, the non-volatile memory 56 holds the order of priority.

In the present exemplary embodiment, the master imaging apparatus 100 changes the order of priority depending on the type of imaging executed by the master imaging apparatus 100. First, an operation executed when the master imaging apparatus 100 captures a moving image will be described. Generally, while capturing a moving image, the master imaging apparatus 100 does not use any flash devices. Instead, the master imaging apparatus 100 needs to acquire sound by using a microphone in synchronization with a moving image as much as possible. Thus, when capturing a moving image, a microphone has a higher priority than flash devices. Namely, the wireless microphone 501 is preferentially connected in an active status, and at least one of the seven flash devices is connected in an inactive status. In the present exemplary embodiment, six of the seven flash devices are connected in an active status and are operated in synchronization with imaging. The remaining one flash device and the GPS receiver 502 are connected in an inactive status.

Next, an operation executed when the master imaging apparatus 100 captures a still image will be described. In this case, unlike capturing a moving image, the master imaging apparatus 100 uses the flash devices, whereas the microphone is not used. Thus, the flash devices have a higher priority than the microphone. Namely, seven flash devices are preferentially connected in an active status. Referring back to FIG. 7, in step S711, the RFMPU 301 repeats this connection process until selecting peripheral devices ends. If the connection process (YES in step S711) ends, the slave connection process ends.

Next, referring back to FIG. 4, in step S103, if flash devices are connected around as wirelessly-connectable illumination devices and if the number of the peripheral flash devices is greater than the number of active flash devices, the active and inactive statuses of the peripheral flash devices are sequentially switched. The RFMPU 301 executes the following process to sequentially check the statuses of all the slave flash devices.

In step S104, the RFMPU 301 examines the active slave flash devices and inactivates slave flash devices whose status (charging status, etc.) has already been checked. Next, in step S105, the RFMPU 301 activates inactive slave flash devices. In step S106, the RFMPU 301 acquires information about statuses (charging status, etc.) from the slaves. The status of steps S105 and S106 will be described with reference to FIGS. 10A-10D.

FIGS. 10A to 10D illustrate connection statuses of the peripheral slave flash devices. First, at the point of time in FIG. 10A, the slave flash devices SS1 to SS6 are set in an active status, and the slave flash device SS7 is set in an inactive status. At the point of time in FIG. 10A, the RFMPU 301 checks the statuses of the slave flash devices SS1 to SS6 (step S106 in FIG. 4). At the point of time when the peripheral flash is next checked in FIG. 10B, the RFMPU 301 shifts the slave flash devices connected in active for one device. Namely, the RFMPU 301 sets the slave flash devices SS1 in an inactive status. While the slave flash devices SS2 to SS7 are changed to active, the RFMPU 301 checks the statuses of the slave flash devices SS3 to SS7 (step S106 in FIG. 4).

Figure 10A:
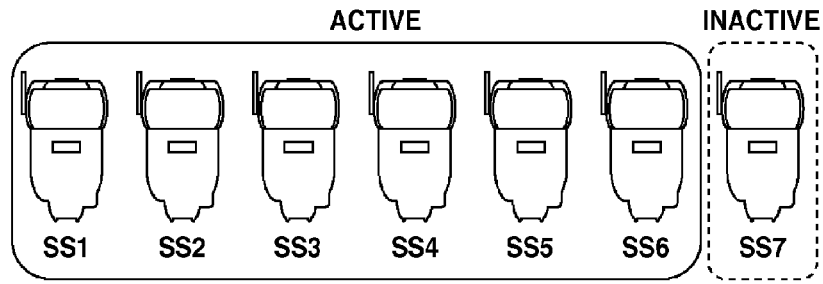
FIGS. 10A-10D illustrates wireless connection statuses of slave flash devices according to the first exemplary embodiment.
Figure 10B:
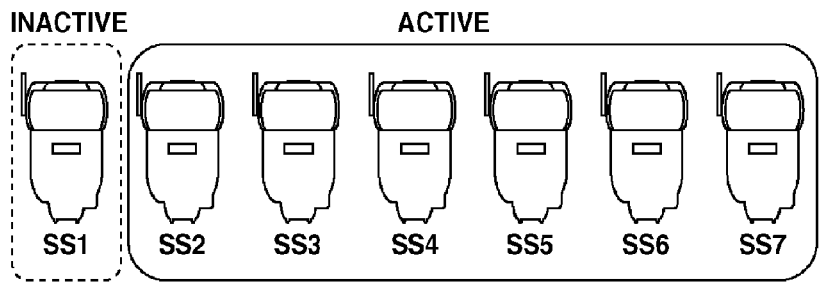
Figure 10C:
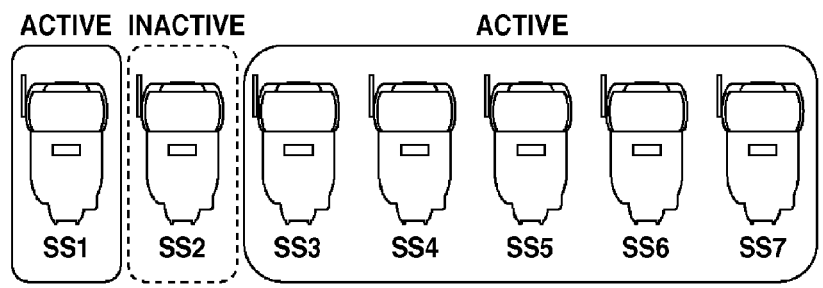
Figure 10D:
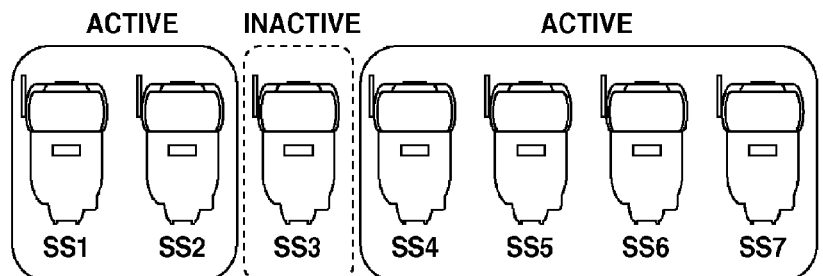

Likewise, the RFMPU 301 switches the active slave flash devices one by one at the point of time illustrated in FIGS. 10C and 10D. In this way, by sequentially switching active and inactive slave flash devices, the RFMPU 301 can check the statuses (charging statuses, etc.) of all the slave flash devices without setting all the slave flash devices in an active status. Next, in step S110 in FIG. 5, the RFMPU 301 transmits the statuses (charging statuses, etc.) of the slave flash devices to the camera MPU 50.

Next, in step S111, the RFMPU 301 determines whether the camera settings indicate a moving image mode. If the camera settings indicate a moving image mode (YES in step S111), the operation proceeds to step S120. If not (NO in step S111), the operation proceeds to step S130. In step S120, if the master imaging apparatus 100 is not ready to capture a moving image, in other words, if the master imaging apparatus 100 is in the optical viewfinder status in which the mirror 1 and the shutter 9 in FIG. 1 are lowered and closed respectively, the operation proceeds to step S121. In step S121, the camera MPU 50 drives the mirror control circuit 41, raises the mirror 1, drives the shutter control circuit 40, and opens the shutter 9.

Next, in step S122, to capture a moving image, the image sensor 14 charges for a predetermined time, the A/D converter 16 executes conversion into a digital signal, and the image processing circuit 20 executes image processing. Based on the luminance level of the acquired image, an exposure value (EV) is determined in accordance with a publicly known method. In addition, the charge time of the image sensor 14 and the aperture value of the imaging lens 200 are determined. The camera MPU 50 transmits the aperture value to the lens control MPU 206, and the lens control MPU 206 drives the aperture control circuit 205 and controls the aperture 204 to have a predetermined aperture value.

In addition, the camera MPU 50 executes automatic focus detection in accordance with a publicly known method referred to as contrast AF that is based on high frequency components of the image and instructs the lens control MPU 206 to execute focus drive. In step S123, the lens control MPU 206 drives the focus lens 201 via the focus control circuit 211. At the same time, in step S124, the recording medium 120 sequentially records the image as a moving image, and the display device 28 displays the captured image.

Next, in step S125, if the user presses the shutter switch SW2 (64) (YES in step S125) while the camera MPU 50 is capturing the moving image, the camera MPU 50 temporarily stops capturing the moving image, and the operation proceeds to step S133 to capture a still image. If not (NO in step S125), the operation proceeds to step S126. In step S126, if it is determined to continue capturing the moving image (YES in step S126), the operation returns to step S122 to repeat the above-described steps of capturing a moving image. If it is determined to finish continuing capturing the moving image (NO in step S126), the operation proceeds to step S127, and the camera MPU 50 executes operations opposite to those executed in step S121. More specifically, in step S127, the camera MPU 50 closes the shutter 9 and lowers the mirror 1. After finishing capturing the moving image, the operation returns to step S103.

In step S111, if the camera settings do not indicate a moving image mode (NO in step S111), the operation proceeds to step S130 and determines determination is made whether the user has pressed the light-metering and range-finding start switch SW1 (63). In step S130, if the user has not pressed the switch SW1 (63) (OFF in step S130), the operation returns to step S103. Otherwise (ON in step S130), the operation proceeds to step S131. In step S131, the light metering sensor 7 in FIG. 1 measures the object luminance, the camera MPU 50 calculates an aperture value and a shutter speed for imaging in accordance with a publicly known method, and the focus detector 6 detects the defocus state of the object.

The camera MPU 50 transmits the detected defocus state to the lens control MPU 206, and the lens control MPU 206 drives the focus lens 201 via the focus control circuit 211. In this way, in step S131, the object is focused.

Next, in step S132, the camera MPU 50 determines whether the user has pressed the shutter switch SW2 (64). If the user has not pressed the shutter switch SW2 (64) (OFF in step S132), the operation returns to step S103. Otherwise (ON in step S132), the operation proceeds to step S133. In step S133, the camera MPU 50 determines whether imaging is possible with the flash devices, based on the charging statuses of the slave flash devices acquired from the RFMPU 301 in step S110. If imaging is possible (YES in step S133), the operation proceeds to step S140 in the flow chart in FIG. 6. If not (NO in step S133), the operation proceeds to step S151.

In the following imaging sequence, if the master imaging apparatus 100 is connected to the wireless microphone 501 and the GPS receiver 502 and if the master imaging apparatus 100 captures still images while capturing a moving image as in the present exemplary embodiment, slave devices other than flash devices are not required. Thus, by inactivating slave devices unnecessary for capturing still images and by activating inactive flash devices, the master imaging apparatus 100 can use the maximum number of flash devices to capture still images.

Namely, in step S140, if the number of peripheral flash device is greater than the number of active flash devices, the operation proceeds to step S141. For example, if the number of peripheral flash devices is seven and the number of active flash devices is six (YES in step S140), the operation proceeds to step S141. In step S141, the camera MPU 50 determines whether slave devices, other than flash devices, unnecessary for capturing still images (the wireless microphone 501, the GPS receiver 502, etc.) are active. If unnecessary slave devices are active (YES in step S141), the operation proceeds to step S142. In step S142, the camera MPU 50 inactivates such slave devices (S142), and in step S143, the camera MPU 50 activates inactive flash devices.

Next, in step S144, the camera MPU 50 provides light emission instructions to the slave flash devices, causes all the flash devices set to be active to emit light, and performs imaging with flash devices. Since such imaging with flash devices is described in detail in Japanese Patent Application Laid-Open No. 2000-089306 and the like, description thereof will be omitted herein. If the slave flash devices have not been charged (NO in step S133), in step S151, the camera MPU 50 executes imaging with natural light, based on the aperture and the shutter speed determined in the above-described steps S123 or S131.

Next, after imaging, in step S145, the camera MPU 50 determines whether a GPS receiver inactivated in step S142 exists. If such GPS receiver exists (YES in step S145), in step S146, the camera MPU 50 inactivates a slave flash device set to be active in step S143 to acquire accurate time and location information at the time of imaging from the GPS receiver.

In addition, in step S146, the camera MPU 50 activates the slave GPS receiver, and in step S147, the camera MPU 50 acquires the time and location information at the time of imaging from the slave GPS receiver. Next, in step S148, the camera MPU 50 writes the acquired GPS information in the captured image data. Next in step S149, the camera MPU 50 determines whether the moving image mode continues. If the still image mode ends and the moving image mode starts (YES in step S149), in step S150, the camera MPU 50 activates the GPS receiver and the microphone, and the operation returns to step S103.

In this way, slave devices necessary for an imaging mode are selected based on the order of priority. Thus, it is possible to provide an imaging system effectively using peripheral devices necessary for acquiring information that matches the imaging mode and that can be added to imaging data.

While an exemplary embodiment of the present invention has thus been described above, the present invention is not limited thereto. Various variations and modifications are possible within the scope of the gist of the present invention. In addition, the present invention can also be realized by supplying software (computer program) which realizes the functions of the above exemplary embodiments to a system or an apparatus via a network or an appropriate type of computer-readable storage medium and causing a computer (a CPU, an MPU, etc.) of the system or the apparatus to read and execute the program.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-105416 filed May 10, 2011, and Japanese Patent Application No. 2012-092827 filed Apr. 16, 2012, each of which is hereby incorporated by reference herein in its entirety.

What is claimed is:

1. An imaging apparatus, comprising:
   an imaging unit;
   a communication unit configured to execute data communication with a predetermined number of external devices;
   a search unit configured to search for external devices capable of executing data communication with the communication unit;
   a mode setting unit configured to set one of a plurality of imaging modes; and
   a determination unit configured to, in a case that a number of external devices the search unit has found is greater than the predetermined number, determine with which of the external devices communication is to be activated,
   wherein, the determination unit is further configured to, in a case that the imaging unit executes an imaging process, preferentially activate communication with external devices that are used in the imaging process, and to determine which external devices communication is to be activated in accordance with an order of priority, wherein the priority is based on the imaging mode set by the mode setting unit.

2. The imaging apparatus according to claim 1,
   wherein the external devices include a flash device and a microphone, and
   wherein the determination unit is configured to, in a case that the mode setting unit sets a still image shooting mode, give priority to communication with the flash device over communication with the microphone.

3. The imaging apparatus according to claim 1,
   wherein the external devices include a flash device and a microphone, and
   wherein the determination unit is configured to, in a case that the mode setting unit sets a moving image shooting mode, give priority to communication with the microphone over communication with the flash device.

4. The imaging apparatus according to claim 1,
   wherein the determination unit is configured to, if the number of external devices the search unit has found is greater than the predetermined number and if the communication unit receives a status from each of the external devices, sequentially switch a communication state of at least one of the external devices to activate, and
   wherein the communication unit is configured to receive a status from the external devices whose communication state is switched to active.

5. The imaging apparatus according to claim 1,
   wherein the external devices include a flash device and a global positioning system (GPS), and
   wherein the determination unit is configured to, at least while the imaging unit is shooting a still image, give priority to communication with the flash device over communication with the GPS.

6. The imaging apparatus according to claim 5,
   wherein the determination unit is configured to, after shooting the still image, preferentially activate communication with the GPS.

7. The imaging apparatus according to claim 1,
   wherein the external devices include a microphone and a global positioning system (GPS), and
   wherein the determination unit is configured to, at least while the imaging unit is shooting a moving image, give priority to communication with the microphone over communication with the GPS.

8. The imaging apparatus according to claim 7,
   wherein the determination unit is configured to, after shooting the moving image, preferentially activate communication with the GPS.

9. A method of controlling an imaging apparatus that executes data communication with a predetermined number of external devices, the method comprising:
   executing an imaging process;

searching for external devices configured to execute the data communication;

setting a mode to one of a plurality of imaging modes; and determining, if a number of external devices have been found that is greater than the predetermined number, with which of the external devices communication is to be activated, wherein, further determining, in a case that the imaging process is executed, to preferentially activate communication with external devices that are used in the imaging process and to determine which external devices communication is to be activated in accordance with an order of priority, wherein the priority is based on the imaging mode set by the mode setting unit.

10. A non-transitory computer-readable recording medium configured to store a program for causing a computer to execute the method of claim 9.

* * * * *